Patented Nov. 8, 1938

2,135,940

UNITED STATES PATENT OFFICE 2,135,940

AIR TUBE PACKING

Hanns Heil, Munich, Germany, assignor to the firm Deutsche Kurtin-Oel-Fabriken, Neubiberg, near Munich, Bavaria, Germany No Drawing. Application June 27, 1936, Serial No. 87,663. In Germany April 18, 1934

5 Claims. (Cl. 134—17.5)

Numerous puncture proof compositions for pneumatic tires are known. Caoutchouc solutions, rubber latex, animal and vegetable agglutinants in combination with filling material of inorganic and organic origin have been used for this purpose.

The heretofore known compositions of this type have various disadvantages; some of them damage the caoutchouc tube, others harden inside the tube and thus become ineffective.

None of the known compositions has a sufficient adhesion to caoutchouc to form a permanent and evenly spread protective coat on the inner surface of the air tube.

It has been found that a puncture proof composition far superior to the products mentioned can be obtained by using mixtures, containing besides the usual filling material lead-, or zinc-, or aluminum-soaps colloidally dissolved in saponifiable oils, which are emulsified with water and inspissated for instance by heat-polymerization, or by blowing with air or by transformation with chloride of sulphur.

The puncture proof composition of the present invention may also contain an addition of aluminum hydroxide which gives excellent properties of stability to the preparation.

The puncture proof composition consists e. g. of a paste which is produced in the following manner:

Example 1

| | Parts |
|---|---|
| White lead, or minium, or zinc-white | 70 |
| Kaolin, or whiting, or slate-meal | 30 |
| Ground cork | 20 |
| Ground vegetable seed of any kind | 100 |

These filling materials are mixed and intimately kneaded with an emulsion consisting of the following substances:

| | Parts |
|---|---|
| Aluminum-, or lead-, or zinc-soaps | 70 |
| Saponifiable oils inspissated by heat polymerization, or by blowing with air, or by transformation with chloride of sulphur | 30 |
| Emulsifying agents such as tragacanth dextrine, casein, animal agglutinant | 30 |
| Water | 600 |

Example 2

| | Parts |
|---|---|
| Zinc-soaps | 70 |
| Saponifiable thick oils | 30 |
| Emulsifying agents | 30 |
| Aluminum hydroxide | 30 |
| Are emulsified in water | 600 |

The 30 parts of aluminum hydroxide may be added, also, by dissolving an equivalent quantity of aluminum salt in the 600 parts of water and then transforming with equivalent quantities of ammonium hydroxide or ammonium carbonate.

The emulsion is kneaded with 220 parts of filling material according to Example 1.

The soaps of lead or zinc or aluminium are manufactured by transforming the hydroxides of these metals with fatty acids e. g. linseed-oil, or wood-oil, or resin-acids, or train-oil.

The metal soaps may also be produced over the alkaline soaps which are transformed with water-soluble metallic salts e. g. with aluminium chloride or with zinc-sulphate, or with lead acetate. The precipitate consists of aluminium-, zinc-, or lead-soap according to the particular metal hydroxide or metallic salt added to the mixture. The metal soap is then filtered off, washed and dried.

The colloidal solutions of the zinc- and lead-soaps in saponifiable inspissated oils have a high adhesive power, whereas the adhesive power of aluminum soaps in oil gelatinous masses is slightly less. Therefore a preparation of the last-mentioned kind, although adhering well enough to the inner surface of the caoutchouc tube, can under no circumstance glue the tire to the pneumatic tube, when the latter is punctured.

The thick saponifiable oils produced from natural fatty oils, e. g. by transforming them with chloride of sulphur (sulphurated oils), or by blowing with air (blown oils), or by heat-polymerization, are particularly suitable for obtaining the above properties of the metal-soaps in oil composition.

The puncture proof paste which is pressed into the air-tube through the valve, possesses the following advantages:

It is innocuous to caoutchouc and does not dry up under exclusion of air. It keeps the tube supple and adheres well to the caoutchouc surface. The composition spreads absolutely evenly in the tire without distorting the same and interfering with the running properties of the vehicles. The very nature of the material makes it impossible to interfere with the proper working of the valve. The composition prevents injuries to the tube, because it forms a tough elastic film.

The efficiency of the present composition is not affected by changes in temperature or other climatic conditions.

What I claim is:

1. A puncture sealing composition for the air tubes of pneumatic tires containing filling material insoluble in oil and water, agglutinants, and metal-soaps selected from the group consisting of zinc-, lead- and aluminum-soaps, the metal soaps being dissolved colloidally in inspissated saponifiable oils emulsified with water.

2. A puncture sealing composition for the air tubes of pneumatic tires having a content of filling material insoluble in oil and water, agglutinants, and lead soap which is dissolved colloidally in inspissated saponifiable oils emulsified with water.

3. A puncture sealing composition for the air tubes of pneumatic tires having a content of filling material insoluble in oil and water, agglutinants, and zinc-soap which is dissolved colloidally in inspissated saponifiable oils emulsified with water.

4. A puncture sealing composition for the air tubes of pneumatic tires having a content of filling material insoluble in oil and water, agglutinants, and aluminum soap which is dissolved colloidally in inspissated saponifiable oils emulsified with water.

5. A puncture sealing composition for the air tubes of pneumatic tires containing filling material, agglutinants insoluble in oil and water, metal soaps selected from the group consisting of zinc-, lead- and aluminum-soaps and aluminum hydroxide, the soaps being dissolved colloidally in inspissated saponifiable oils emulsified with water.

HANNS HEIL.